United States Patent
Sharma et al.

(10) Patent No.: US 10,387,906 B1
(45) Date of Patent: *Aug. 20, 2019

(54) METHODS AND SYSTEMS FOR PROVIDING A BEST PRICE GUARANTEE

(71) Applicant: CITICORP CREDIT SERVICES, INC. (USA), New York, NY (US)

(72) Inventors: Neeraj Sharma, New York, NY (US); Ateesh Tankha, Secaucus, NJ (US); Anthony Merola, Merrick, NY (US); Michael Ying, New York, NY (US)

(73) Assignee: Citicorp Credit Services, Inc. (USA), Long Island City, NY (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/822,282

(22) Filed: Aug. 10, 2015

Related U.S. Application Data

(63) Continuation-in-part of application No. 12/795,746, filed on Jun. 8, 2010, now Pat. No. 9,105,022.

(51) Int. Cl.
| | |
|---|---|
| *G06Q 20/34* | (2012.01) |
| *G06Q 30/02* | (2012.01) |
| *G06Q 20/24* | (2012.01) |
| *G06Q 20/26* | (2012.01) |

(52) U.S. Cl.
CPC ......... *G06Q 30/0222* (2013.01); *G06Q 20/24* (2013.01); *G06Q 20/26* (2013.01); *G06Q 20/34* (2013.01)

(58) Field of Classification Search
None
See application file for complete search history.

(56) References Cited

U.S. PATENT DOCUMENTS

| | | | |
|---|---|---|---|
| 5,642,279 A | 6/1997 | Bloomberg et al. | |
| 6,754,636 B1 | 6/2004 | Walker et al. | |
| 8,442,844 B1 | 5/2013 | Trandal et al. | |
| 2002/0138343 A1* | 9/2002 | Weatherford | G06Q 20/10 705/14.34 |
| 2004/0143502 A1 | 7/2004 | McClung, III | |
| 2006/0111930 A1 | 5/2006 | Ayer et al. | |

(Continued)

*Primary Examiner* — Paul Danneman
(74) *Attorney, Agent, or Firm* — Eric L. Sophir; Dentons US LLP

(57) ABSTRACT

A financial institution can provide a best price guarantee to debit or credit card account holders. By providing a consolidated system including automatic price monitoring of purchased products and automatic claim form generation upon identifying a lower price, the consumer is relieved of the burden typically associated with conventional price matching. An exemplary method comprises receiving, by a server, purchase information from a financial customer, wherein the purchase information comprises a purchase price and purchased product description and wherein the customer has a credit or debit card issued by the financial institution; storing, by the server, the purchase information in a first database; locating, by the server, from a second database, stored product information corresponding to the received purchased product description, wherein the stored product information comprises a lowest price datum; comparing, by the server, the lowest price datum to the purchase price; and, if the lowest price datum is less than the purchase price, generating a claim form for the financial customer.

24 Claims, 14 Drawing Sheets

(56) References Cited

U.S. PATENT DOCUMENTS

| | | | |
|---|---|---|---|
| 2007/0265914 A1* | 11/2007 | McClung, III | G06Q 30/0211 705/14.14 |
| 2008/0059318 A1* | 3/2008 | Packes, Jr. | G06Q 20/201 705/20 |
| 2009/0289114 A1 | 11/2009 | Grigsby et al. | |
| 2011/0125561 A1* | 5/2011 | Marcus | G06Q 20/32 705/14.15 |

* cited by examiner

METHODS AND SYSTEMS FOR PROVIDING A BEST PRICE GUARANTEE

CROSS-REFERENCE TO RELATED APPLICATIONS

This application is a continuation-in-part of U.S. patent application Ser. No. 14/795,746, filed Jun. 8, 2010, which is hereby incorporated by reference in its entirety.

FIELD OF THE INVENTION

The invention relates to computer-implemented methods and systems for providing a best price guarantee to a customer of a financial institution.

BACKGROUND

Many retailers attempt to sell goods or services to potential customers with a guarantee that the retailer is offering the lowest price. If the customer makes a purchase from the retailer and finds that a competitor of the retailer is offering the product or service at a lower price and the customer can provide proof of the competitor's lower price, then the retailer will refund or rebate the difference between the purchase price and the competitor's lower price. The retailer's price matching policy is an attempt to encourage prospective buyers to purchase goods immediately and without checking competitors for lower prices. For purchases from multiple retailers, a customer must visit each retailer with proof of lower prices by competitors in an attempt to collect a refund from each retailer.

Theoretically, a retailer's price matching policy attempts to simplify customer purchases by allowing customers to buy any item from the retailer with customer having the security of knowing that the customer is paying the lowest price in the market for that product or service. Unfortunately, the conventional price protection program places a heavy burden on customers such that they must: (1) continually monitor advertisements for lower prices, (2) save a qualifying advertisement as evidence of the lowest price offer, (3) bring the advertisement to the original retailer, and (4) fill out a claim form with the appropriate information. Moreover, not all retailers offer price matching policies. There are no conventional computer systems that can track this comparative pricing data upon a purchase by a customer and generate a request to pay the customer when a lower price has been identified.

A need, therefore, exits for an improved program that provides a customer with the lowest available price, wherein the program applies to any retail item purchased by the customer, no matter which retailer sold that item. Moreover, there is a need for a program wherein every purchase by a customer can be automatically tracked to determine the existence of a lower advertised price with an option to have a claim form or payment file automatically generated and provided to the customer in the event of a lower price offer.

SUMMARY OF THE INVENTION

Exemplary embodiments described herein overcome the drawbacks of conventional computer systems and price matching policies provided by retailers. An exemplary solution described herein comprises computer systems and computer-implemented methods that can operate more efficiently than conventional systems and can dynamically generate and transmit data files to achieved the desired result. Customers with a credit or debit card issued by a financial institution may use their card to make retail purchases subject to a best price guarantee of the financial institution at any location. By providing the financial institution, or a third party associated with the financial institution, the purchase information, a customer may be guaranteed to receive a rebate or refund if the price of the system identifies that the retailer lowered the price or if another retailer is offering a lower price for that item. Other exemplary embodiments described herein provide automatic monitoring of prices on purchased products, automatic claim form generation in the event of qualifying price decrease. The embodiments described herein, therefore, can provide a viable option for customers who want to take advantage of a price matching policy, but do not otherwise have the time or energy to participate in such a program.

In one embodiment, a computer-implemented method for a financial institution to provide a best price guarantee to customers is provided. The method comprises receiving, by a server, purchase information from a financial customer, wherein the purchase information comprises a purchase price and purchased product description and wherein the customer has a credit or debit card issued by the financial institution; storing, by the server, the purchase information in a first database; locating, by the server, from a second database, stored product information corresponding to the received purchased product description, wherein the stored product information comprises a lowest price datum; comparing, by the server, the lowest price datum to the purchase price; and, if the lowest price datum is less than the purchase price, generating a claim form for the financial customer.

In another exemplary embodiment, a system for providing a best price guarantee to consumers is provided comprising a server of a financial institution adapted to receive purchase information from a financial customer, wherein the purchase information comprises a purchase price and purchased product description and wherein the customer has a credit or debit card issued by the financial institution; a first database communicatively coupled to the server and adapted to store the purchase information; and a second database communicatively coupled to the server and adapted to store product information, wherein the product information comprises a lowest price datum; wherein the server locates the product information from the second database corresponding to the purchase information located at the first database, and wherein the server compares the lowest price datum to the purchase price, and wherein, the server generated a claim form for the financial customer if the lowest price is less than the purchase price.

In yet another exemplary embodiment, a computer program product, comprising a computer usable medium having computer readable program code embodied therein, the computer readable program code adapted to be executed to implement a method for providing a refund to a customer for a lower price of a purchased product is provided. The method comprises providing a system, wherein the system comprises distinct software modules, and wherein the distinct software modules comprise a customer identification module, a product identification module, a price identification module, and a claim submission module; receiving, by the customer identification module, information input from the customer that identifies the customer; receiving, by the product identification module, a description of a product purchased by the customer; comparing, by the product identification module, the description of the product to a listing of description of products to identify a matched product; identifying, by the price identification module, available prices for the matched product within a predetermined time period; identifying, by the price identification module, a lower price for the purchased product; generating, by the claim submission module, a claim form for providing the customer with a refund based upon the identified lower price, wherein the customer purchased the purchased product using a credit card or a debit card issued by a financial institution, and wherein the financial institution offers the operation of computer program product to the customer.

In another embodiment, a computer-implemented method comprises receiving, by a server of the financial institution, purchase information regarding a customer who completed a transaction to purchase a product or service using a credit or debit card issued by the financial institution, wherein the purchase information comprises a purchase price and purchased product or service description of the purchased product or service and an identifier of the financial customer's credit or debit card issued by the financial institution; storing, by the server, the purchase information in a first database; locating, by the server, from a second database, stored product or service information corresponding to the received purchased product description from a completed purchase transaction, wherein the stored product information comprises a lowest price datum; tracking, by the server, the lowest price datum within a predetermined time period from the purchase of the product or service; comparing, by the server, the lowest price datum to the purchase price; and when a difference between the lowest price datum and the purchase price of the completed purchase transaction is within the predetermined time period from the purchase of the product or service, generating and transmitting a data file based on the data representing a difference between the lowest price datum and the purchase price that initiates a payment to the customer.

In yet another embodiment, a system comprises a server of a financial institution adapted to receive purchase information regarding a customer who completed a transaction to purchase a product or service using a credit or debit card issued by the financial institution, wherein the purchase information comprises a purchase price and purchased product or service description of the purchased product or service and an identifier of the financial customer's credit or debit card issued by the financial institution; a first database communicatively coupled to the server and adapted to store the purchase information from a completed product purchase transaction; and a second database communicatively coupled to the server and adapted to store product or service information, wherein the product information comprises a lowest price datum; wherein the server tracks the product or service information from the second database corresponding to the purchase information located at the first database within a predetermined time period from the purchase of the product or service, and wherein the server compares the lowest price datum to the purchase price, and wherein the server generates and transmits a data file based on the difference between the lowest price datum and the purchase price for the customer when the lowest price is less than the purchase price within the predetermined time period from the purchase of the product or service, wherein the data file initiates a payment to the customer.

In another embodiment, a computer program product, comprising a computer usable medium having computer readable program code embodied therein, the computer readable program code adapted to be executed by a processor to implement a method comprising receiving, by a customer identification module of the program code executed by the processor, information input that identifies the customer; receiving, by a product identification module of the program code executed by the processor, a product description of a product or service from a cellular phone of the customer; identifying, by the product identification module of the program code executed by the processor, the product based on the product or service description; identifying, by the price identification module of the program code executed by the processor, available prices for the identified product or service within a predetermined time period; identifying, by the price identification module of the program code executed by the processor, a lower price for the purchased product or service; and generating, by a claim submission module of the program code executed by the processor, a data file initiating a payment to the customer with a refund based upon the lower price identified during the predetermined time period.

In yet another embodiment, a computer program product, comprising a computer usable medium having computer readable program code embodied therein, the computer readable program code adapted to be executed by a processor to implement a method comprising receiving, by a customer identification module of the program code executed by the processor, information input that identifies the customer; receiving, by a product identification module of the program code executed by the processor, a product description of a product or service from a cellular phone of the customer; identifying, by the product identification module of the program code executed by the processor, the product based on the product or service description; identifying, by the price identification module of the program code executed by the processor, available prices for the identified product or service within a predetermined time period; identifying, by the price identification module of the program code executed by the processor, a lower price for the purchased product or service; and generating, by a claim submission module of the program code executed by the processor, a data file initiating a payment to the customer with a refund based upon the lower price identified during the predetermined time period.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIG. 4 shows a screen shot of a user interface according to an exemplary embodiment.

FIG. 5 shows a screen shot of a user interface according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Exemplary embodiments, as described below, allow a financial institution (also referred to herein as a "bank") to offer price protection, or a "best price guarantee" to credit or debit card customers. In certain embodiments, a financial institution may offer a best price guarantee on any item purchased with a credit card, debit card, or other payment card issued by the financial institution. The best price guarantee may require minimal effort on the part of the customer, requiring only the entering of information about the purchase into the system.

For example, if a customer uses a credit card issued by a bank to purchase a specific model television from an electronics store for $2,000, that customer may be eligible for a refund under a best price guarantee offered by the bank. First, using a customer's computer, the customer may enter the transaction information on to the bank's website, including such information as purchase price, date of purchase, location of purchase, and item purchased. The transaction information may be stored by the bank on a server or other storage device. The price of the same model television may then be automatically monitored for a predetermined time period (i.e., 30 or 60 days) by receiving price data from one or more external sources. At the end of the predetermined time period, the system may compare the $2,000 purchase price to the lowest price for which the same model television was offered within that period. If the lowest price is less than $2,000, whether the price is offered by the same retailer or another retailer, the system may generate and complete a claim form to be transmitted to the customer via such methods as email, mail, or download. The claim form may be generated and populated or completed with any information stored on the server, and may be verified by the customer. Once received, the claim form may be verified and signed by the customer. The signed claim form can be transmitted to an entity, such as an insurance provider, who sends a payment to the customer for the difference in price between the purchase price and lowest price.

Figure 1:
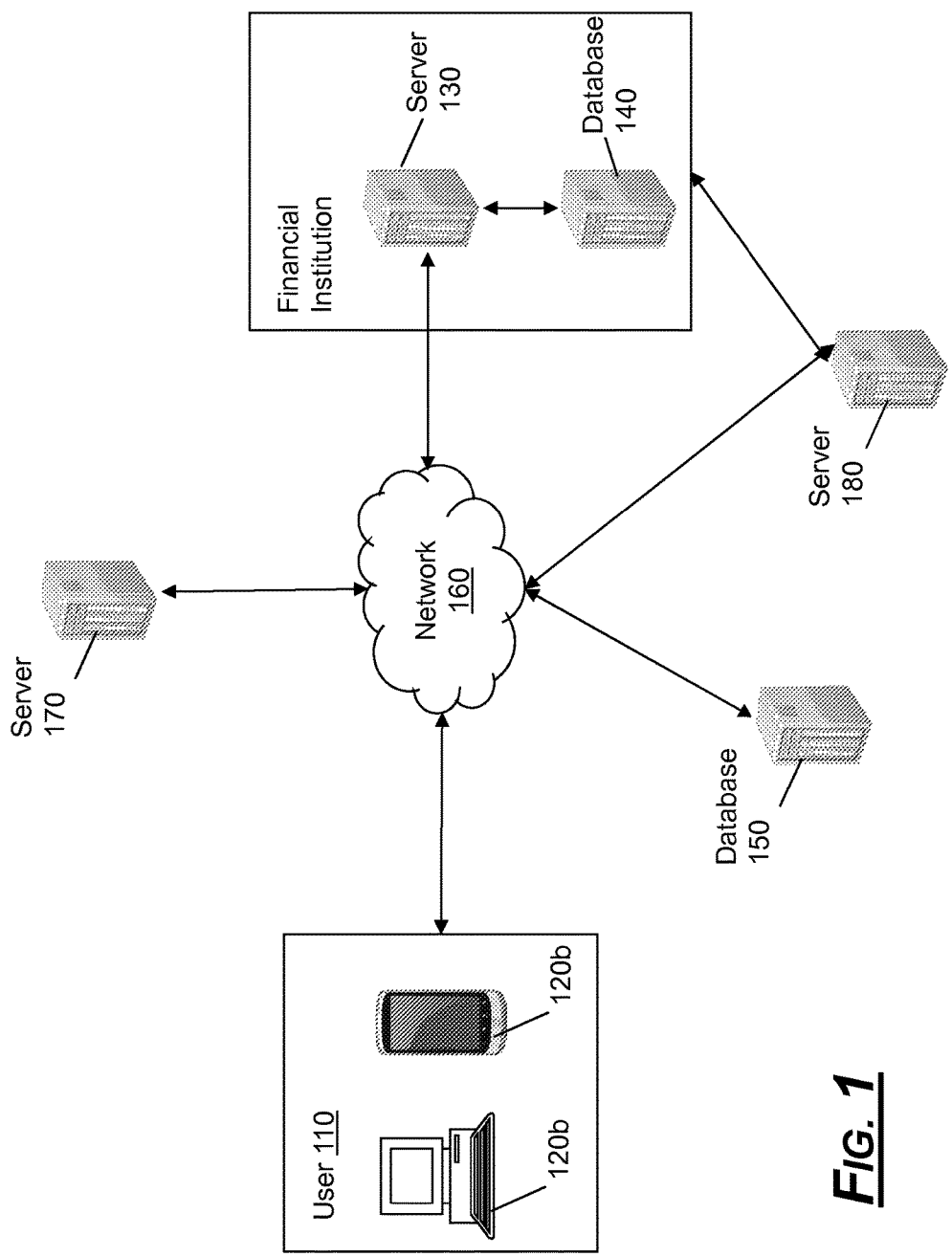
FIG. 1 shows a system architecture according to an exemplary embodiment.

Referring to FIG. 1, a user 110 operates an electronic device 120a, 120b, including, but not limited to, personal computer, special purpose computer, tablet, automated teller machine (ATM), kiosk, personal digital assistant (PDAs), wireless device, cellular or mobile phone, tablet computer, or any other electronic device capable of processing data to access financial products, services, or information located on servers 130 (including processors, software, etc.) and/or databases 140 of a financial institution or capable of submitting information to a financial institution over a network 160. In this exemplary embodiment, electronic device 120a is a personal computer, and electronic device 120b is a smart phone, mobile phone, or cellular phone. The electronic device 120a, 120b can have a camera for capturing images.

Communication networks 160 include, but are not limited to, the Internet, intranets, wireless networks, Bluetooth networks, fiber optic networks, existing telephone networks, credit networks, and other networks that link the electronic device 120a, 120b, server 130 and database 140. Additionally, at least one external product information database 150 may be communicatively coupled to the servers 130 and databases 140 of the financial institution. Alternatively, each of the server 130, database 140, and database 150 can be located at the same or remote locations, and can be operated by the same or separate entities. The financial institution's server 130 and database 140 can host a website, maintain customer information, and/or execute at least a portion of a best price guarantee program.

The external product information database 150 may be maintained at hosts of retailer websites, hosts of online shopping websites, third party pricing services, third party insurance companies, third party service providers, and the like, in order to provide pricing information. The external product information database 150 can store information from a server that collects from or searches other networked sources, such as websites of retailers and online product databases. Additionally, the external product information database 150 may be populated by manually collecting product information from print advertisements including newspapers, magazines, pamphlets and flyers, pictures of billboards, recordings of radio or television advertisements, in-store advertisements or any other advertisement or offer capable of being verified and transmitted.

It will be understood that a user 110 of an electronic device 120a, 120b can be an existing or a prospective customer of a financial institution, a groups of individuals, or another entity having a credit account, debit account, or other payment account (e.g., stored value account, gift card account, reward currency account) with the financial institution. For example, the user can be a customer that already possesses a credit card issued by the financial institution but is not yet registered for the best price guarantee service. In another example, the user can be a prospective customer who is using the best price guarantee service on a trial basis. In yet another example, the user may be a credit card owning customer of the financial institution who has previously registered for the best price guarantee service. Despite the various entities that can qualify as a user, the exemplary embodiments utilize "user" and "customer" interchangeably, but a user is not intended to be limited to an existing customer.

Furthermore, it will be understood that the electronic device 120a, 120b may be physically located at a branch of a financial organization, at a user's home or office or at any location where the device can be connected to a network. For example, a mobile phone may access the network 160 at nearly any location in world. In another embodiment, a user 110 may log on to the system using a laptop computer located at the user's place of work.

The electronic device 120a, 120b can include three components: (a) a processing component, (b) a display component, and (c) an input component. The processing component can include a computer processor necessary for handling the computations, processing, and other functionality of the device. The display can be a LCD, LED, OLED, CRT, 3D or stereoscopic screens, projectors, or any other type of display. Exemplary input devices may include, for example a keyboard and mouse, touch screen, or a camera, all of which can be integrated in the electronic device 120a, 120b or electrically coupled thereto.

Optional enhancements to the electronic device 120a, 120b can add additional service features or maintain a secure session with the user. In certain embodiments, peripheral devices may be connected to, or integrated in, an electronic device 120a, 120b to enhance a user's experience. The peripheral devices may be connected through the network 160, though they may also be physically connected or even connected via a different network. Exemplary peripheral devices may include digital cameras, display devices, speakers, processors (along with software to carry out the process), input devices, biometric devices (e.g., for fingerprints, iris scan, facial recognition, voice recognition), printers, scanners, deposit/dispense devices, card readers, barcode readers (including QR code readers), PIN pads/electronic signature capture, remote camera controls, and other devices without limitation.

In one embodiment, a printer may be connected, for example, for the printing of completed claim forms received by the financial institution or graphical displays of the purchased product's price over time. In another embodiment, a scanner is present for the scanning of receipts, documents, product packaging, and the like. Additional embodiments include a digital camera such that, for example, a user may take a picture of a recently purchased product, the product packaging, or a receipt from the purchase of the product or server. The picture may be transmitted via the network 160 to the server 130, where the purchased product or service may be determined by the system. The camera coupled to the electronic device 120a, 120b can capture an image of a receipt, and the electronic device 120a, 120b can transmit the image for processing to the server 130, the electronic device 120a, 120b can transmit the image of the receipt to a third party for processing, or an application on the electronic device 120a, 120b can process the image and send the data to the server 130.

In yet another example, a barcode reader is connected to the electronic device 120a, 120b to allow a user 110 to scan a barcode located on purchased product packaging into the system. The barcode reader may be a camera of the electronic device 120a, 120b that is used to capture an image of the barcode, process the image using an application on the electronic device 120a, 120b to determine what barcode was scanned, and generate and transmit a data file that identifies the barcode that was scanned. The application on the electronic device may be a thin or thick client, whereby the application can transmit the image to the server 130, and the server 130 can identify the product by processing the image of the barcode.

A merchant server 170 can be communicatively coupled to the network 160 for communicating with the server 130. The merchant server 170 can be associated with the point of sale system of the merchant (not shown), which may include at least one point of sale terminal and a database that stores purchase information, customer information, product and service information, and store information. Upon completing a transaction between the customer and the merchant, the merchant server 170 can be configured to identify those accounts on a batch or individual basis that are associated with the financial institution server 130. In one example, this determination can be performed by the merchant server 170 identifying the account number as being associated with the financial institution. In another example, this determination can be performed by the merchant server 170 by identifying the first few digits (e.g., four or six digits or using the bank identification number) of the payment card account. The merchant server 170 automatically generates a data file comprising purchase information to be transmitted to the server 130 only for those purchases having the particular accounts associated with the financial institution server 130. These accounts can be selected because they are accounts of the financial institution. Alternatively, these accounts can be selected because they have been predetermined and identified in a record as being associated with a program described herein.

An underwriter server 180 can be communicatively coupled to the network 160 and/or directly coupled to the server 130. The underwriter server 180 can be associated with an underwriter or insurer. The underwriter server 180 is configured to receive a data file generated by the server 130 that has information about the purchase. The data file can include information about the purchase, where the purchase was conducted, price, customer data, and information about the lower price (e.g., where the lower price is offered, date of the offer, and any terms associated with that price). The underwriter server 180 can verify or confirm information in the data file and then generate a request for payment to the customer for the difference between the lowest price in the predetermined time period and the purchase price. The generated payment request is transmitted to a payment processor server (not shown).

The server 130 is a specially-programmed computer that comprises a non-transitory computer readable medium comprising computer program instructions that are executed by a processor to perform the functionality described herein. In an exemplary embodiment, the server 130 comprises a customer identification module, a product identification module, and a claim submission module. In one example, the server 130 is configured to receive, by a customer identification module of the program code executed by the processor, information input that identifies the customer; receive, by a product identification module of the program code executed by the processor, a product description of a product or service from a cellular phone of the customer; identify, by the product identification module of the program code executed by the processor, the product based on the product or service description; identify, by the price identification module of the program code executed by the processor, available prices for the identified product or service within a predetermined time period; identify, by the price identification module of the program code executed by the processor, a lower price for the purchased product or service; and generate, by a claim submission module of the program code executed by the processor, a data file initiating a payment to the customer with a refund based upon the lower price identified during the predetermined time period.

In another example, the server 130 is configured to receive, by a customer identification module of the program code executed by the processor, information input that identifies the customer; receive, by a product identification module of the program code executed by the processor, a product description of a product or service from a cellular phone of the customer; identifying, by the product identification module of the program code executed by the processor, the product based on the product or service description; identify, by the price identification module of the program code executed by the processor, available prices for the identified product or service within a predetermined time period; identify, by the price identification module of the program code executed by the processor, a lower price for the purchased product or service; and generate, by a claim submission module of the program code executed by the processor, a data file initiating a payment to the customer with a refund based upon the lower price identified during the predetermined time period.

Figure 2:
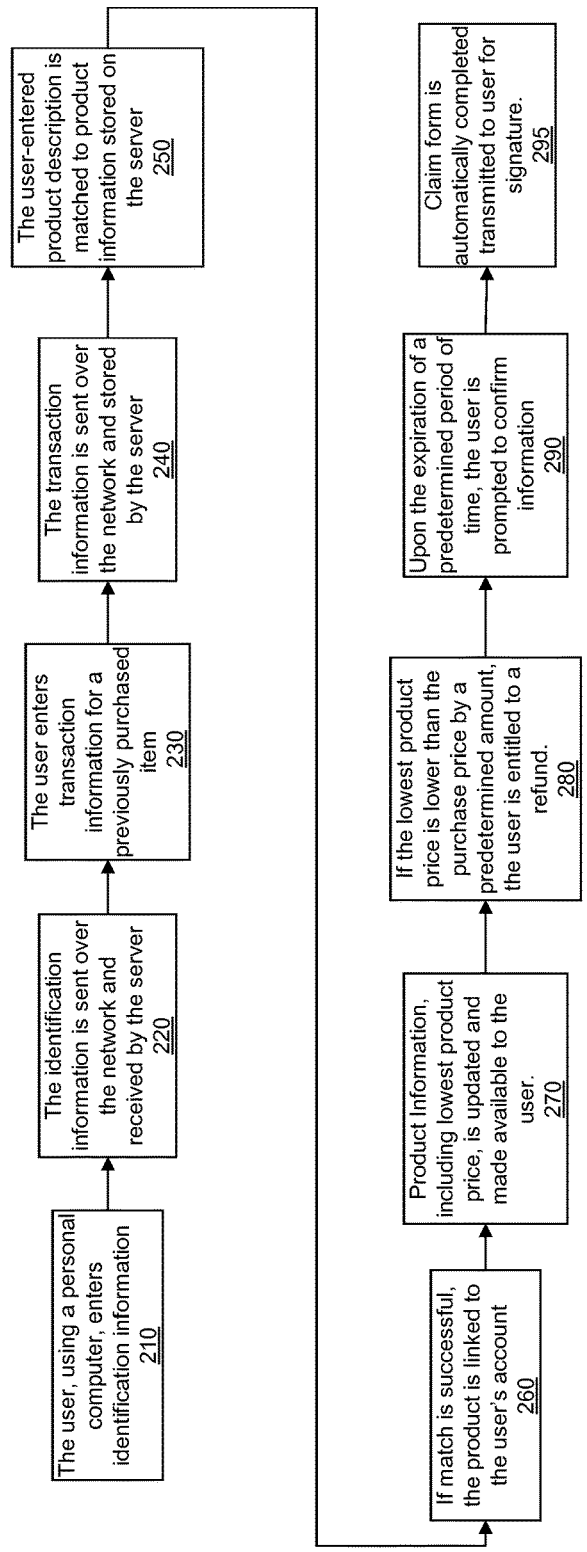
FIG. 2 is a flow chart of a method according to an exemplary embodiment.

Referring to FIG. 2, an exemplary method for a financial institution to provide a best price guarantee to a user is shown. It is intended that the exemplary method depicted in FIG. 2 may be executed in a various ways, and the following description should not be limited to a particular order. In this exemplary embodiment, a user may access a website to instruct a program operated by a financial institution's server that stores information related to purchases made with a credit or debit card issued by the financial institution. In the exemplary embodiment of FIG. 2, the user has a credit card account with the financial institution, and credit card account includes the best price guarantee feature. Additionally, the user has created a username and password to access account information such as claim eligibility on previously purchased products and claim history. In an alternative embodiment, the user may be an account holder at the financial institution, but may be a first-time user of the best price guarantee service. As a result, the user may be required to register with the service before submitting any requests.

At 210, a user accesses the website using a personal computer and enters identification information. The identification information may include any information that identifies and verifies the user to the financial institution or affiliated service, such as the user's name, address, phone number, social security number, account number, pin number, age, sex, race, ethnicity, username, password, or biometric information. If the user is logging into the system for the first time, the system may require the user to provide a username and password. If the user has already established a username/password combination, the user may enter the information at a sign-on screen. Additionally, the system may prompt the user to store the username and password either locally or on a network server. In an alternative embodiment, the attached peripheral devices may be used to recognize and authenticate the user, including biometric mechanisms, such as facial recognition, retina scan, voice recognition, or a fingerprint scan.

At 220, the identification information is sent over the network by the user's personal computer and received by the financial institution's server. In one embodiment, the identification information is stored, for example, locally on the personal computer. Alternatively, the identification information can be stored on the server. Once stored, the identification information may be accessed by a program executed by a server to automatically complete documents or display information to the user. For example, if the program determines that the user is entitled to refund based on a drop in price since the date of purchase, the program may use the entered identification information, such as the user's name and address, to populate a claim form. It should be appreciated that identification information may be sent and received via a secure connection over the network.

Referring to 230, the user enters transaction information for a previously purchased item into the program. The transaction information can include a description of the product purchased, a price paid for the product, a date the product was purchased, a retailer from which the product was purchased, an address of the retailer, and/or a receipt number. The description of the product may include a model number, model name, serial number, product code, product key, product name, UPC, brand name, or any other information that may identify the product purchased to the system. In one embodiment, the transaction information may be entered into the program using an input device, such as a keyboard or keypad. In an alternative embodiment, the UPC code may be scanned by the user with an attached barcode scanner or digital camera containing appropriate software. In yet another embodiment, the user may scan the receipt listing the purchased product or take a picture of the same using a digital camera. In another embodiment, the user may send a digital picture of the product itself.

At 240, once the user enters transaction information for a previously purchased item, the transaction information may be sent over the network and stored on the server in, for example, a purchased products database. The purchased products database may contain transaction information corresponding to any number of purchased products entered by the user. For example, a user may enter transaction information for both a television and microwave purchased the week before. It will be understood that the purchased products database and the transaction information contained therein may be accessed by the server to automatically generate and populate documents such as product information pages and claim forms.

At 250, the user-entered transaction information may be compared to product information stored on a server in, for example, a product information database, to attempt to match the purchased product with a data representation of that product stored in the system. In one embodiment, the product information database may be populated with information about any number of products including, but not limited to, antiques, art, books, electronics, motor vehicles, clothing, toys, entertainment items, health and beauty items, home and garden products, jewelry, music products, live stock, real estate, specialty services, sporting goods, memorabilia and collectables, tickets, travel, and any other item, product or service.

The product information database may be created by collecting and storing information from any number of external sources, such as, for example, retailer websites, price comparison websites or services, in-store pricing, and any/all forms of advertisements. It will be understood that, although the product information database is described above in the singular, any number of databases may be used to store the product information, including a separate database for each product. Moreover, the product information database may be located external to the financial institution at, for example, a third party host or vendor.

As an example, the product information database may be populated with pricing and availability information regarding a specific model of laptop computer by implementing a program to automatically search any number of electronic retailer websites for pricing information about that particular model. The search results, including offer prices, may then be stored in the product information database. As another example, the data may be manually entered by an employee who visits physical locations of retail stores or searches through printed publications. In yet another example, the user may submit an advertisement for the same model laptop computer found in her local newspaper or a magazine. The database can then be updated with the submitted information.

Once the transaction information is sent to the server, the purchased product information contained therein may be automatically compared to the product information database to determine if there is a product match. Although it will be recognized that there are many ways of matching data, in a preferred embodiment, the UPC code of the purchased product is compared to the product database to determine if they are identical. In another embodiment, if the user has provided a scanned receipt, the receipt may be read, and the product code may be obtained therefrom. If the product code corresponds to a product located within the product information database, the system determines that a match has been made.

Once a match is determined, the product may be associated with or linked to the user's account 260. In this way, the user may access information, such as pricing information, located in the product information database to determine if a lower price has been found for the purchased product. For example, a user who purchases a watch may enter a description of the watch, such as the name brand and model type, into the best price guarantee program. Once the program determines a match in the product information database, the watch may be linked to the user's profile for convenient monitoring of price. In this example, the user may log into her account, click an icon of the watch or textual link, and immediately see if a lower price is available.

Alternatively, if a match cannot be determined, the user may be prompted to enter additional information about the purchased product. If a match still cannot be determined, the user may submit a form to request that a particular product be added to the product information database.

At 270, the product information database may be updated with pricing and availability information for each product. In one embodiment, the product information database may be updated in real-time or near real-time as new information is searched and received from external sources. In other embodiments, the product information database may be updated at predetermined time intervals. The predetermined time intervals can be based on any time measurement, such as one minute, one hour, one day, one week, two weeks, one month, or every three months. As the product information database is updated, the user may view the product information for any purchased product linked to the user's account. For example, if the user's account is linked to a particular model television and a particular model toaster, the user would be able to view up-to-date information about either of those products, including, but not limited to, the lowest price either product was offered for sale since the purchase date. Because of the periodic review of external sources, the user may have access to lower price information in substantially real-time.

In another embodiment, the user may search for and view the product information for any product, even if the user has not purchased that product. Using this feature, the user could view past price fluctuations in order to make a more educated purchase.

At 280, the system compares the lowest price at which the linked product has been offered since the date of purchase to the purchase price entered by the user. In one embodiment, if the lowest price offered is lower than the purchase price by any amount, the user may be entitled to a refund of the price difference. For example, if the user purchased a specific model of computer for $500, and the same model computer is offered for $475 the next week, the user may be entitled to a refund. The system can automatically notify the user via, for example, text message, email or phone, that a refund may be available. Alternatively, the user could view the product information by logging into the user's account and selecting the linked product.

In another embodiment, if the lowest price offered is lower than the purchase price by more than a predetermined amount, the user may be entitled to a refund of the price difference. It will be understood that the predetermined amount may be any amount agreed upon by the user and the financial institution or any amount imposed by the financial institution. For example, if a user is only entitled to a refund when the price drops by $30, a user who buys a certain model computer for $500 will not be eligible for a refund, and thus will not be notified, if that product drops to $475. In another example, the predetermined amount can be a percentage of the purchase price, such as 5% or 10%. In yet another example, the predetermined amount can vary (either an increase or decrease) as the purchase price increases. In still yet another example, the predetermined amount can depend upon a user's classification within the financial institution, e.g., a gold account, a platinum account, or a business account. In another embodiment, there may no restrictions on when a refund is offered, as long as the lowest price is less than the purchase price and the lowest price is identified as being offered during a predetermined time period.

In another embodiment, the user may only be entitled to a refund if a lower price is identified within a predetermined period of time from the date of purchase. As an example, if the predetermined period of time is 30 days, a user who buys a certain model computer for $500 on January 1st would not be entitled to a refund unless the product was offered for a lower price within a 30 day period. If, for example, the price remained above $500 until February 15th, the user would not be entitled to a refund if the price dropped to $475 on this date. It will be understood that the predetermined period of time may be any period of time agreed upon by the user and the financial institution or imposed by the financial institution, such as one week, two weeks, three weeks, one month, two months, or three months.

At 290, upon the expiration of a predetermined period of time, the system can prompt the user to confirm information. If the system has identified a lower price for the product, then the system may require the user to verify information and/or confirm that the user would like to generate a claim form to obtain a refund. The prompt can be a notification on the financial institution's website, an e-mail message to the user, an automated telephone call, or any other notification method.

At 295, the system automatically generates and completes a claim form having fields for personal information, rebate information, purchase information and the like. The claim form may be customized to a particular entity's requirements, and the server may store any number of templates for use in generating specific claim forms. In one embodiment, the server may generate a default claim form based on a default entity's specifications. In an alternative embodiment, the user may select the particular entity to which she will send the claim form to obtain the refund.

Irrespective of the format of the claim form generated, the form may be completed with information from both the product information database and the transaction information entered by the user. Alternatively, if all the required information is not stored on the system, the user may be prompted to enter additional information. The user may also be prompted to verify the veracity of the information before the claim form is completed by clicking a link, button, or icon after reviewing the information.

In one embodiment, the completed claim form may be transmitted to the user by any appropriate means including, but not limited to, email, mail, fax, digital medium, or by providing a linked file capable of being downloaded by the user. Once the user obtains the completed claim form, she may sign it and transmit it to an entity using any agreeable means.

Alternatively, information about the product or service in a purchase can be transmitted from the electronic device without requiring the customer to type the purchase information details into the electronic device. The customer can log into the system associated with the financial institution server, so information uploaded or transmitted from the customer, merchant, or other source can be associated with that particular customer. Upon the server receiving receipt information from the customer or merchant, the server can associate the transaction with a particular product or service without the need to request that the customer identify the product or service purchased. Optionally, however, the server can request that the customer confirm the identified product or service from the transaction.

In one embodiment, an electronic device is used to capture an image of a receipt of the purchase of a product or service. When a receipt is printed by a point of sale terminal at a merchant, a camera of the electronic device can capture an image of the receipt. This image may be captured at the point of sale or at a later date. A receipt often contains information such as a date of purchase, at least a portion of a payment card number used in that purchase, a listing of each product or service purchased by name or SKU number, and a price for each purchased product or service.

The server can obtain the information from the image in various ways. In a first embodiment, the electronic device has an application that is configured to perform optical character recognition of the receipt and extract the information from the receipt. The application generates a data file containing this information. The electronic device transmits this data file with the information from the receipt to the server. The server receives this data file, extracts the receipt information from the data file, and stores the receipt information in the database in a record associated with the customer. Alternatively, the server can receive the image, perform the optical character recognition, extract the receipt information, and store it in a record associated with the customer. In some instances, when the image is unclear or illegible, a graphical user interface (e.g., a web page) may request that the customer indicate a portion of the receipt that contains particular information (e.g., upon a prompt of "where is the date of purchase?") or assist the server in recognizing a character. The electronic device can be used to highlight a portion of the receipt or to receive an input of the requested information.

In a second embodiment of how the server can obtain the information from the image of the receipt, the electronic device can capture the image of the receipt and transmit it to a third party server, who can process the image to extract the receipt information (e.g., using optical character recognition). The third party server will automatically perform this extraction upon receipt from the electronic device and then automatically generate a data file for transmission to the financial institution server with the extracted receipt information.

In another example, the merchant server can transmit the purchase information to the financial institution server. The merchant's point of sale system stores information about the purchase, which includes information printed on the receipt. The merchant server can query a database for a listing of account numbers or portions of account numbers associated with the financial institution and then identify the records of the recent purchases that have those account numbers. Alternatively, the merchant server can store a listing of account numbers associated with the financial institution or associated with this rebate program, and the merchant server can identify the transactions associated with those account numbers. The identification of the accounts can occur as a transaction is completed or on a periodic basis (e.g., hourly, daily, weekly, monthly). The merchant server will then transmit the purchase information to the financial institution server, where the purchase information can include an identification of the product or service purchased. As a result, the customer will not be required to input information about the product or service or otherwise identify the product or service. Once the server has the information about the product or service, the server can monitor and track prices associated with that product or service.

Figure 14:
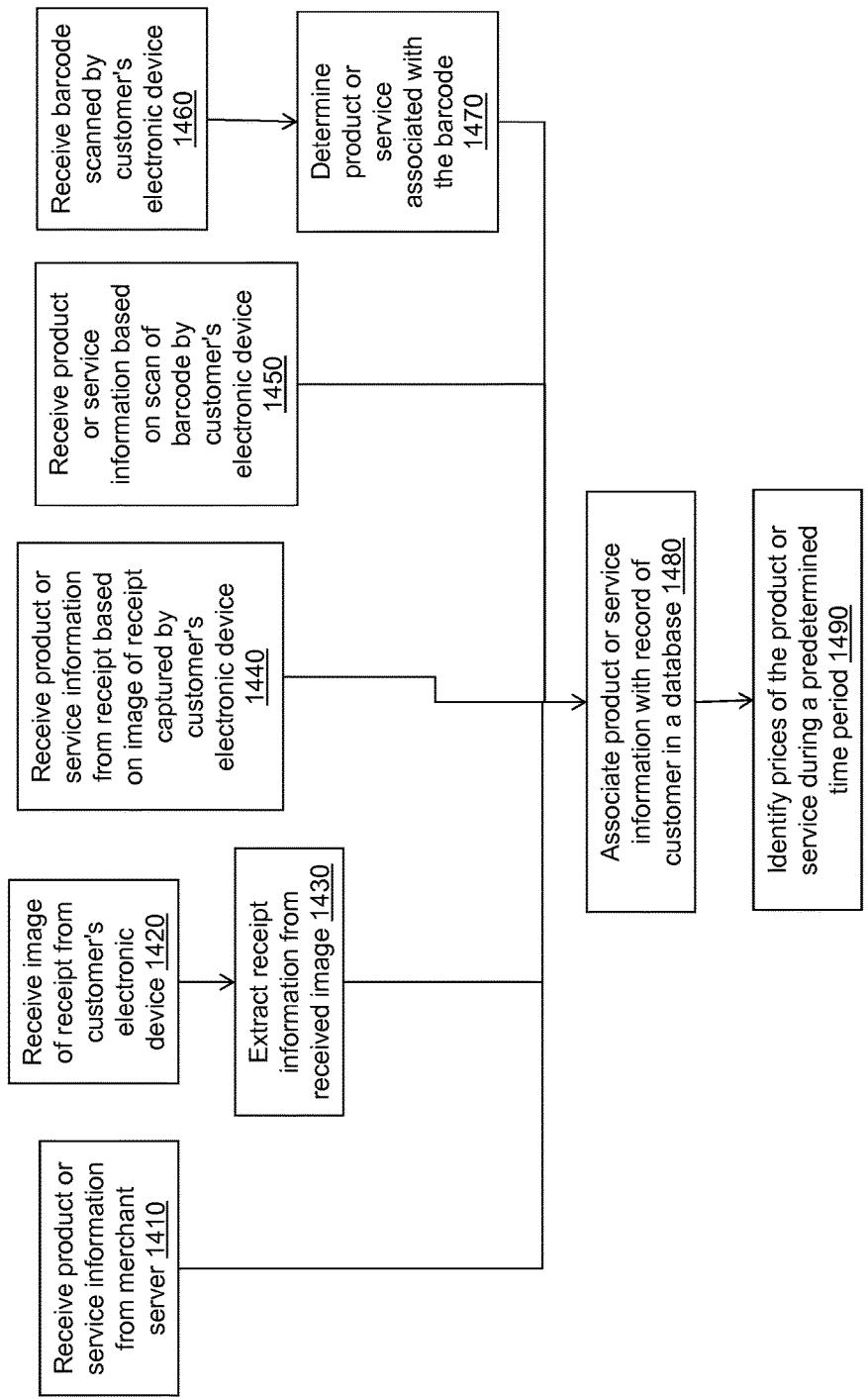
FIG. 14 shows a flow chart of a method according to an exemplary embodiment.

Referring to FIG. 14, a flow chart illustrates various methods that the financial institution server can receive product or service information. In step 1410, the server can receive product or service information from a merchant server. In step 1420, an image of a receipt is received from a customer's electronic device. In step 1430, the server extracts receipt information from the image of the receipt. In step 1440, the server receives product or service information from receipt based on image of receipt captured by customer's electronic device. In step 1450, the server receives product or service information based on scan of barcode by customer's electronic device. In step 1460, the server receives a barcode scanned by customer's electronic device. In step 1470, the server determines the product or service associated with the barcode. In step 1480, the server associates the product or service information with record of customer in a database. In step 1490, the server identifies prices of the product or service during a predetermined time period.

Figure 3:
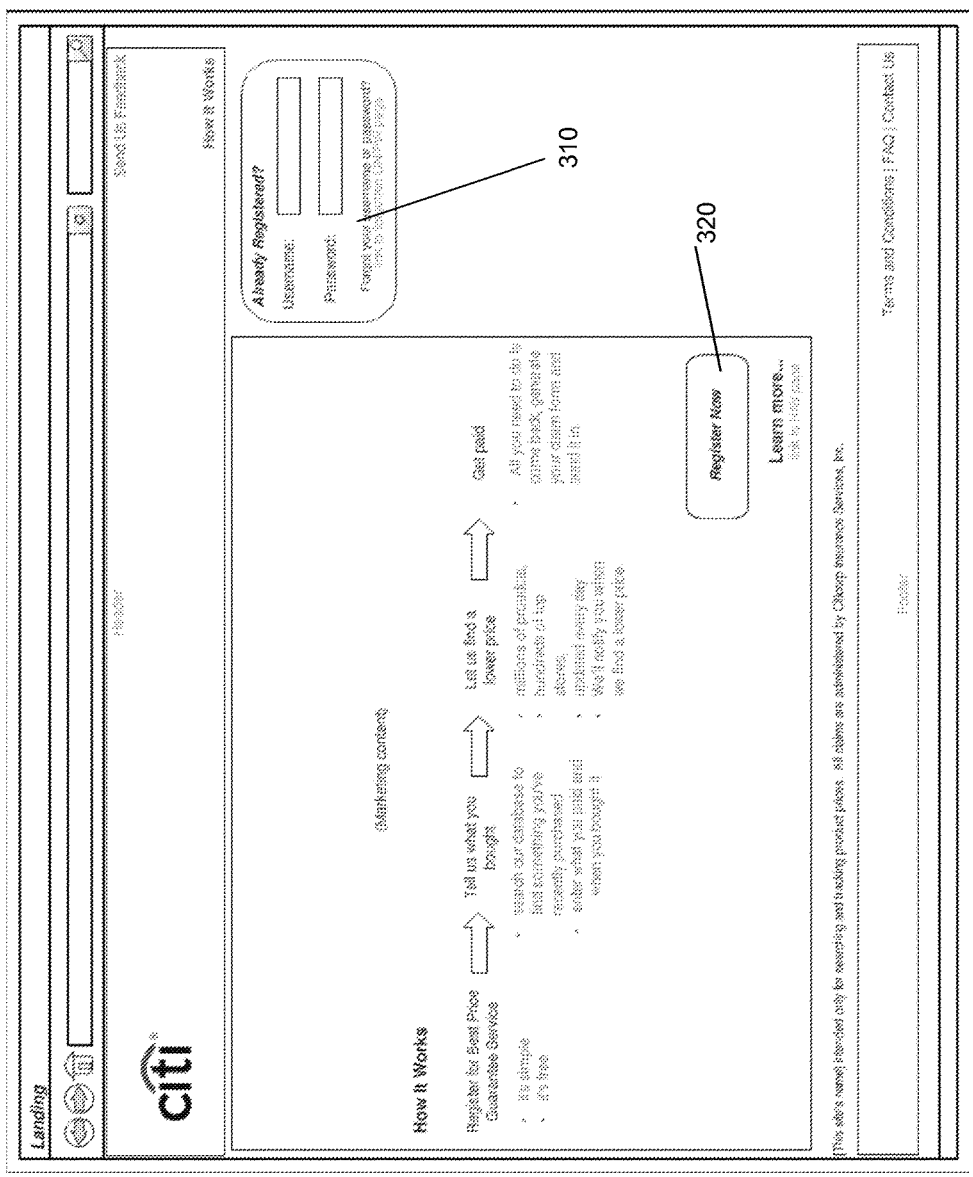
FIG. 3 shows a screen shot of a user interface according to an exemplary embodiment.

Referring to FIG. 3, a screenshot of a user interface according to an exemplary embodiment is shown. In this particular embodiment, a user of a computer, or any other electronic device capable of accessing the internet, has navigated to a financial institution's website. The webpage shown may be considered a "welcome screen," and may explain to a user the details of a best price guarantee. The user may be an existing customer of the financial institution or may be a potential customer. If the user is an existing customer of the financial institution, the user may be a registered user of the best price guarantee service or an unregistered user of the service. In the former case, the user may enter a previously created username and password at a sign in prompt 310 to access the service. If a user is not a registered user of the service, the user may click the "Register Now" button, icon, or link 320 to create a username and password.

Figure 4:
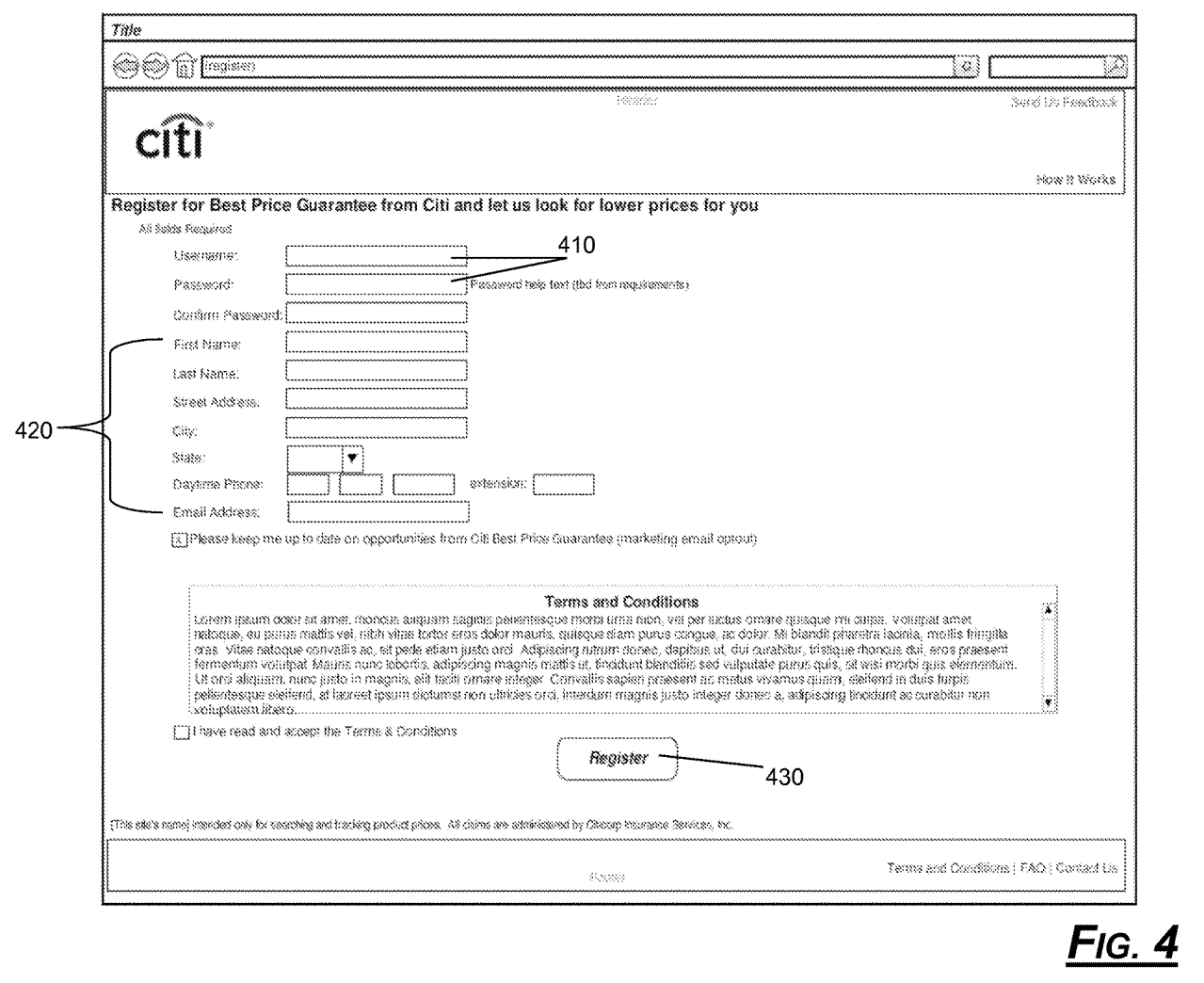

Referring to FIG. 4, a screenshot of a registration screen according to an exemplary embodiment is shown. An unregistered customer of the financial institution may be required to register for the best price guarantee service before being able to access the features thereof. To register, the user may enter a desired username and password 410. If the entered username is available, and both the username and password 410 conform to any program requirements, the username may be assigned to the user and an account may be created and linked to that username. Additionally, the unregistered user may be prompted to enter personal information 420 such as, first name, last name, street address, city, state, daytime phone, and an email address. Once the user has completed the required fields, the user may select the "Register" button, icon, or link 430 to have an account created and stored on the server.

In one embodiment, the personal information 420 may be stored on a server and accessed by the best price guarantee program. For example, if a user is eligible for a refund due to an identification of a retailer with a lower price for the purchased item, the program may use the personal information 420 to complete a claim form. In another embodiment, the personal information may be stored locally on a user's personal computer or other electronic device.

Figure 5:
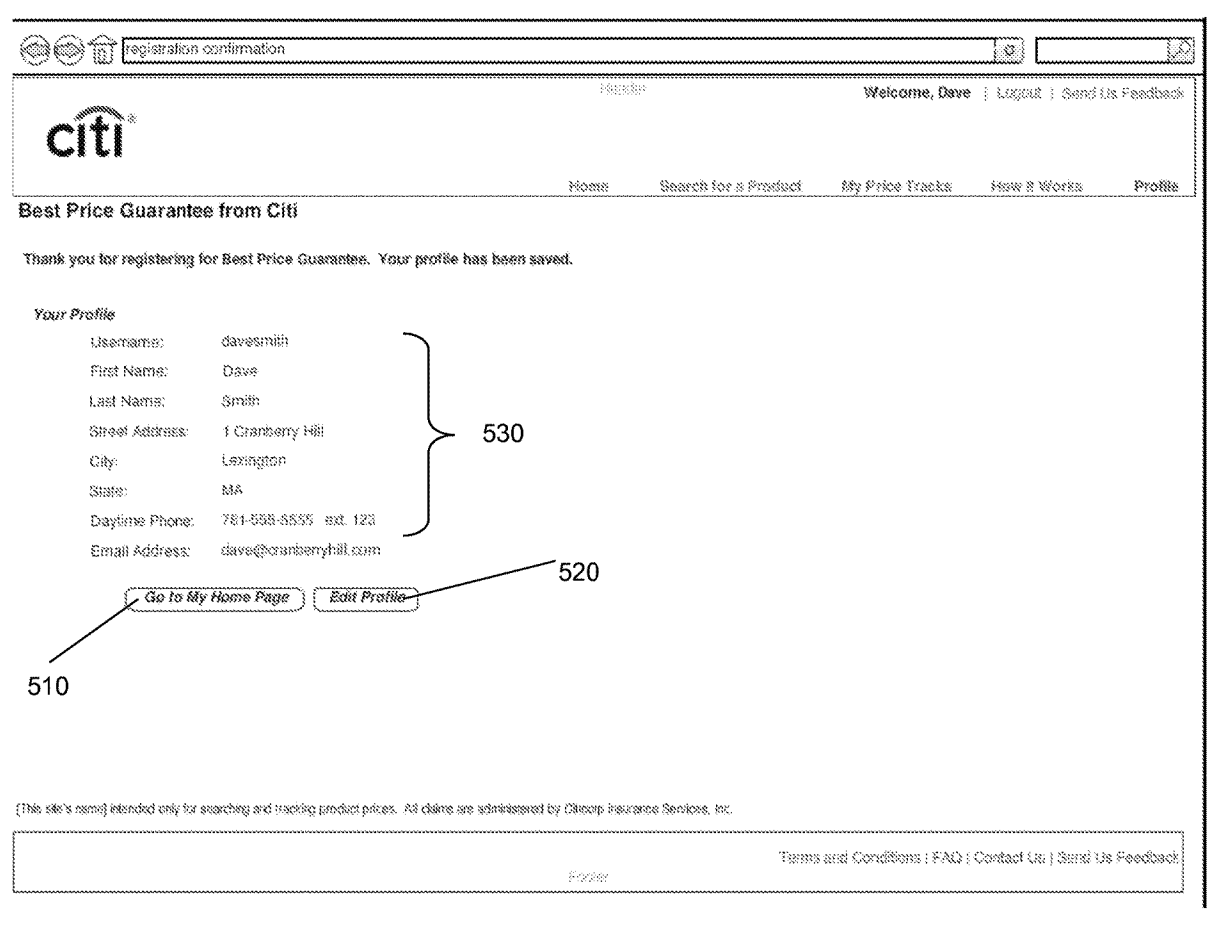

At FIG. 5, a screen shot of an exemplary embodiment of a confirmation page is shown. In this particular embodiment, the user has completed the registration process by, for example, entering the requested personal information and selecting a username and password. The user's personal information 530 may be displayed for verification purposes. Additionally, the user may be provided with an option to either "Go to My Home Page" 510 or "Edit Profile" 520. If the user selects the "Edit Profile" button, icon, or link 520, the user may be directed to a webpage where the user may edit such information as personal information 530 and the user's password. If the user selects the "Go to My Home Page" button, icon, or line 510, the user may be directed to a webpage or homepage with additional options, such as the webpage shown in FIG. 6.

Figure 6:
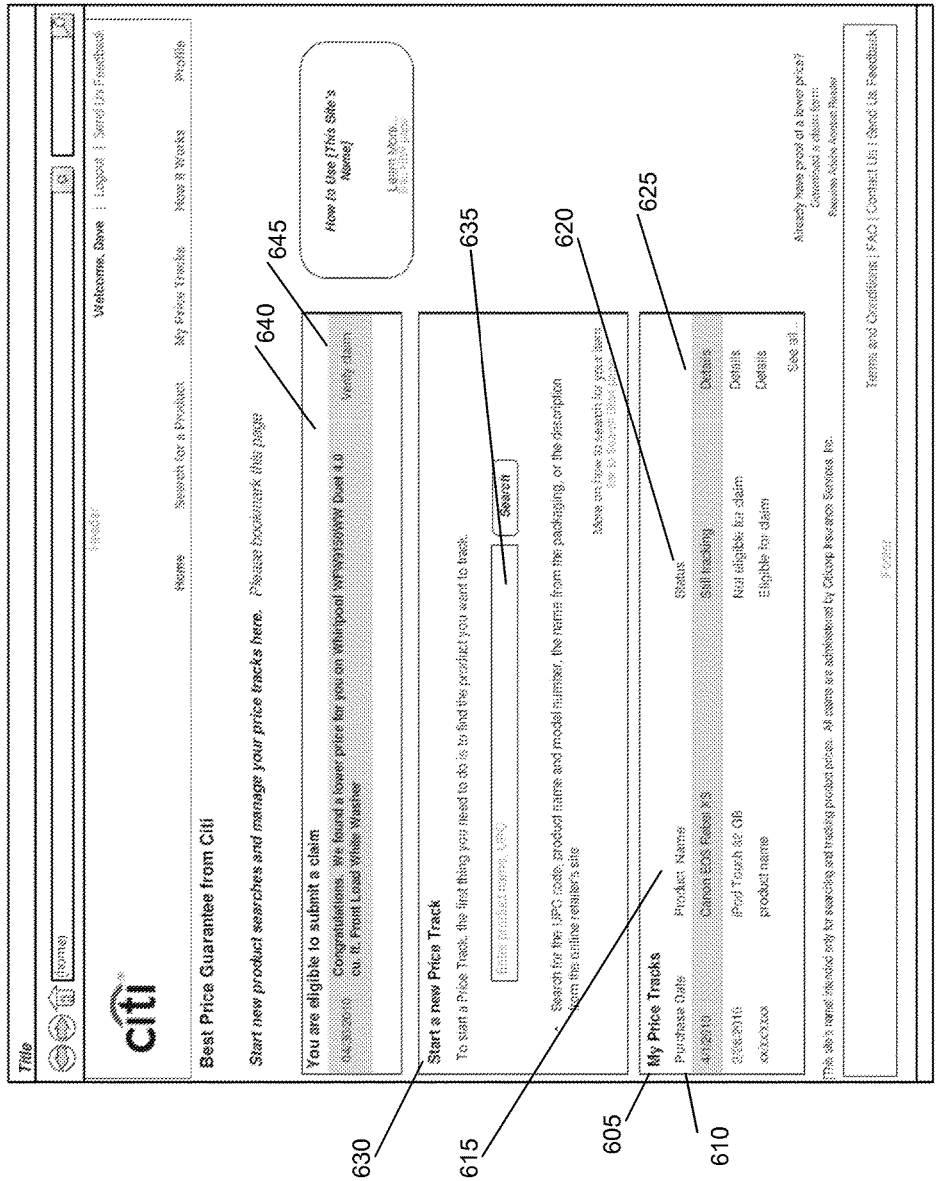
FIG. 6 shows a screen shot of a user interface according to an exemplary embodiment.

Referring to FIG. 6, a screenshot of a homepage for submitting or tracking a claim according to an exemplary embodiment is shown. As shown, a number of windows may be displayed within the homepage to provide information to the user. The windows include, but are not limited to, a Price Tracker window 605, a New Search window 630, and an Eligible Claims window 640. It will be appreciated that, although shown as three separate windows, any number of windows may be displayed to the user. In certain embodiments, the user or the financial institution may customize the windows, including the location of each window and the information displayed in each window. In other embodiments, the user or the financial institution may choose from a number of possible window templates, themes, or skins and may create additional windows depending on preference.

In one embodiment, a Price Tracker window 605 displays a list of previously purchased items, which have been entered into the system by the user and linked to the user's account. As shown, multiple purchased items may be entered into the system and simultaneously tracked at the same time. In one embodiment, the purchase date 610, product name 615, status 620, and hyperlinks to any available details 625 may be displayed to the user. The purchased products may be displayed according to any order selected by the user. In one embodiment, the purchased products are displayed according to purchase date 610 by default.

With regard to the purchase date 610 and the product name 615, the data may be entered by the user and stored on the server. For example, the user in this exemplary embodiment has previously purchased a "Canon EOS Rebel XS" on Apr. 1, 2010 and has entered this information into the system. Additionally, the user purchased an "iPod Touch 32 GB" on Feb. 28, 2010 and has also entered this information into the system.

The Status information 620 corresponding to each listed purchased product may reflect the status of the search for a price lower than the purchase price. If the program has not found a lower price, the status 620 may be reflected as, for example, "still tracking." In this situation, the system may continue to look for a lower price until a lower price is found and/or a predetermined period of time extending from the purchase date expires. As an example, that the product name 615 identified as a "Canon EOS Rebel XS" has a purchase date 610 of Apr. 1, 2010 and reflects a status 620 of "still tracking." If the system finds a lower price for this purchased product, the status 620 may change from "still tracking" to, for example, "eligible for a claim." If, however, the system is unable to find a lower price before the expiration of a predetermined period of time, the status 620 may change from "still tracking" to, for example, "not eligible for claim." It will be appreciated that any text, symbol, icon, or character may be displayed in the status 620 column.

In one embodiment, if the status 620 is reflected as, for example, "eligible for a claim," the user may immediately instruct the program to generate a claim form to secure a refund of the price difference between the lower price and the purchase price. In another embodiment, the user may wait until the expiration of a predetermined time period extending from the date of purchase to request a claim form. If the user decides to wait until after the time period expires, then the financial institution may implement an additional time period to submit a claim form. In yet another embodiment, the user may request a first claim form upon a first indication of a lower price and then request a second claim form upon a second indication of an even lower price before the expiration of a predetermined time period. Although described as a "first claim form" and "second claim form," it will be recognized that any number of claim forms may be requested depending on how often the price of the purchased product drops before the expiration of the predetermined time period.

Further, a Price Tracker window 630 may be displayed to a user wherein a data entry field 635 provides the user with an opportunity to enter a description of a purchased product. As discussed above, the product description may include a model number, model name, serial number, product code, product key, product name, UPC, brand name or any other information that may identify the product purchased. In one embodiment, the transaction information may be entered into the program using an input device, such as a keyboard or keypad. In another embodiment, the UPC code may be scanned by the user with a barcode scanner or digital camera containing appropriate software. The scanned information may then be entered into the data entry field 635. In yet another embodiment, the user may scan the receipt listing the purchased product or take a picture of the same using a digital camera. The receipt information may then be uploaded and entered into the data entry field 635 according to any means, such as optical character recognition. In one exemplary embodiment, the user may take a digital picture of the product itself to be uploaded to the system. The system may then compare the image to any images stored on a server connected to the network, for example, within a product information database.

As shown in the exemplary embodiment of FIG. 6, a graphical user interface may display an Eligible Claim window 640 with an option to verify a claim 645. The Eligible Claim window 640 may display a notification to a user that the system has found at least one of the user's purchased products for a price lower than the purchase price, and as such, the user is entitled to a refund equal to the price difference. In one embodiment, the user may be eligible for a rebate at any time after purchasing a product, as long as the system has identified a lower price of the product as compared to the purchase price. In an alternative embodiment, the user may not be eligible to collect a refund until a predetermined period of time, such as 30 or 60 days, has expired. In yet another embodiment, a user may not be eligible to collect a refund in the event of an identification of a lower price, unless the difference in price between the new, lower offer and the purchase price is above a certain predetermined amount.

In certain embodiments, once an Eligible Claim window 640 is displayed, a user may click on the "verify claim" button, icon, or link 645 to be transferred to a new webpage, which may display relevant information to be used in completing a claim form. Once at the new webpage, the user may verify the veracity of the information before the claim form is completed.

Figure 7:
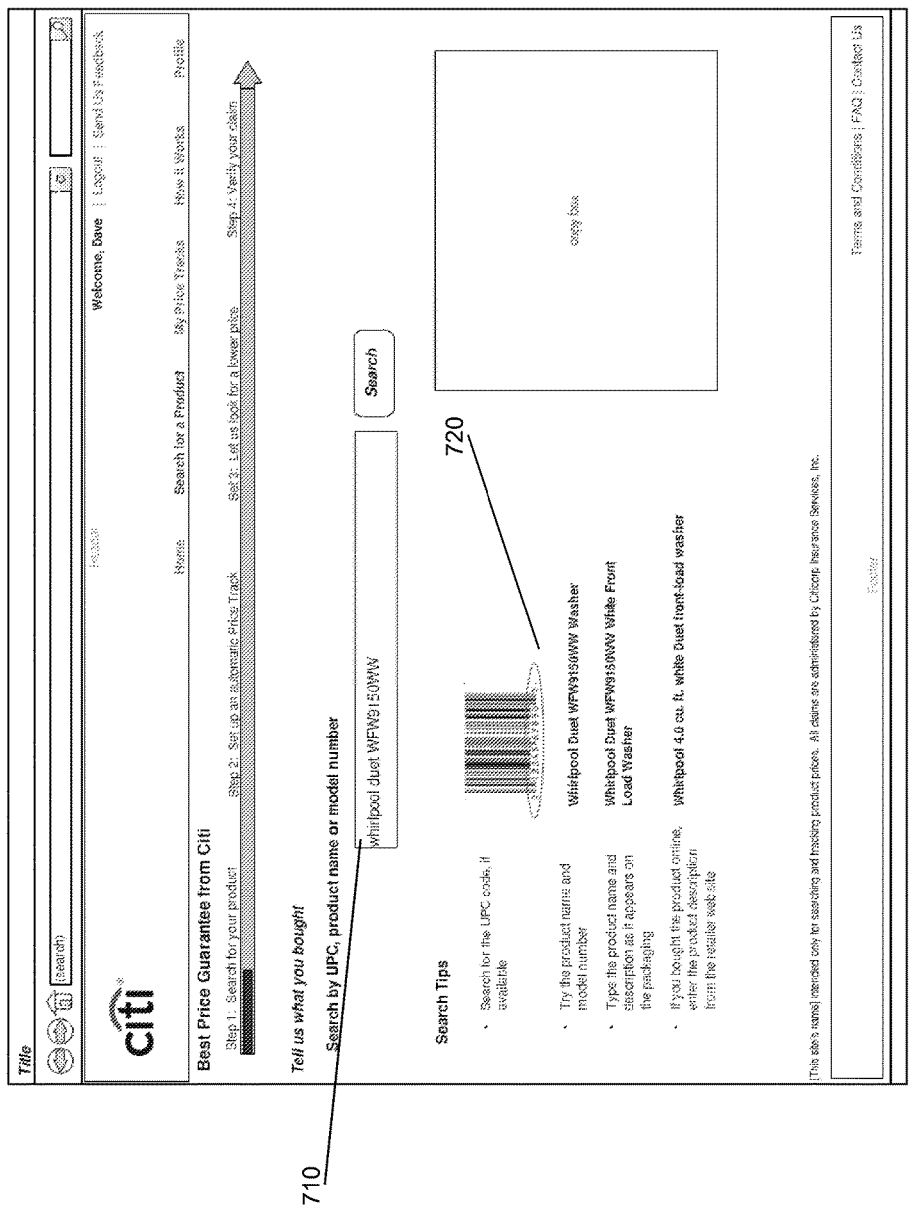
FIG. 7 shows a screen shot of a user interface according to an exemplary embodiment.

Referring to FIG. 7, a screenshot of a user interface according to an exemplary embodiment is shown. The user may enter a description of the purchased product, e.g., UPC code or product name, within the data entry field 710 in order to allow the system to match or correlate the purchased product to a product stored on the system in, for example, a product information database. In one embodiment, an auto-complete feature is provided, wherein an exemplary description 720 may be automatically displayed to the user based on the data entered within the entry field 710. For example, if a user begins typing a product description by entering a phrase such as "baseball bat," a number of specific models of baseball bats and baseball bat images stored in the product information database may be automatically displayed to the user for selection. In another embodiment, the exemplary description 720 may be static or may not be displayed at all.

Figure 8:
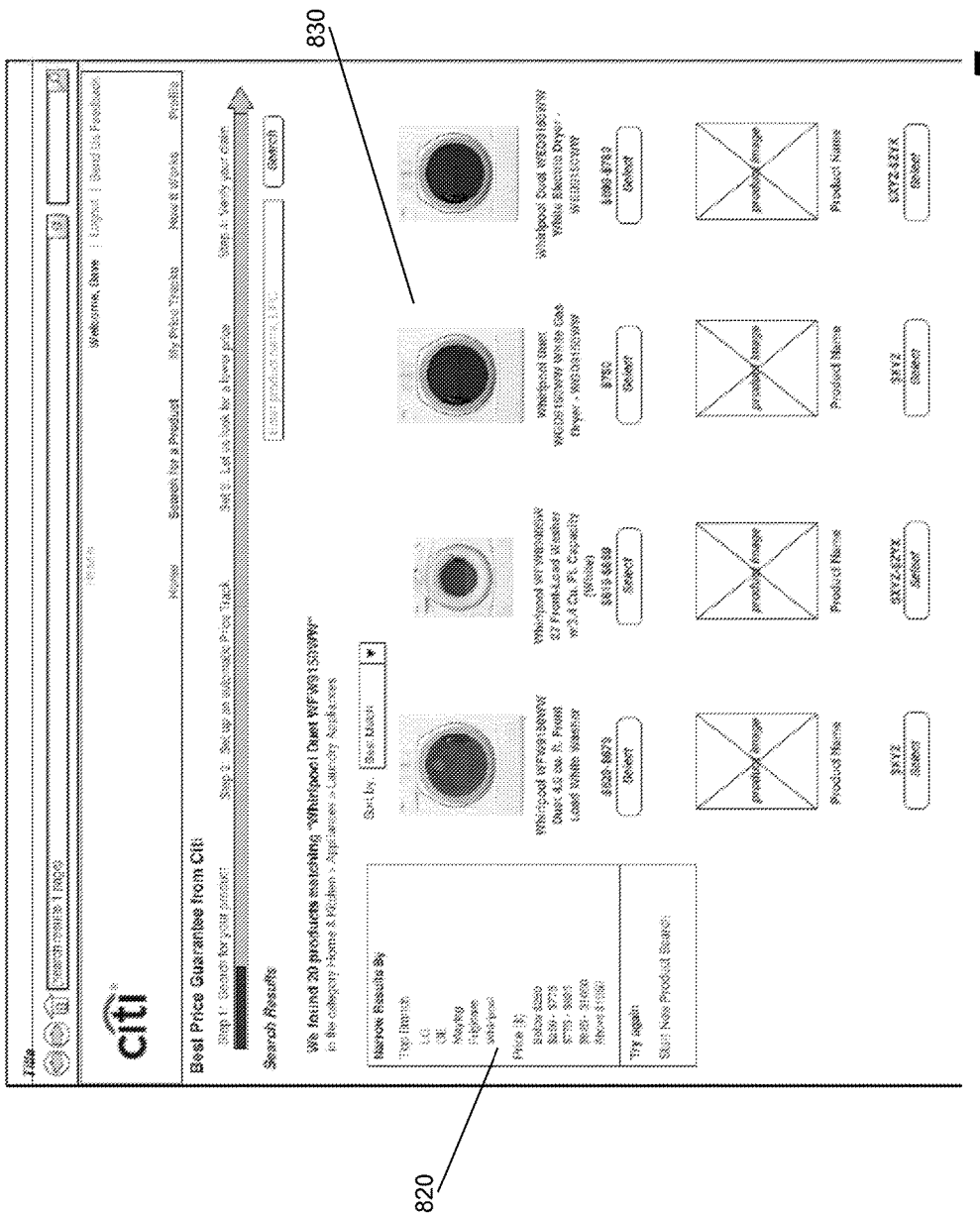
FIG. 8 shows a screen shot of a user interface according to an exemplary embodiment.

Referring to FIG. 8, a screenshot of a user interface according to an exemplary embodiment is shown. Once a user has entered a description of a purchased product, the system may attempt to match or correlate the description to a particular product that is eligible for tracking and is stored in the system. In one embodiment, the matching or correlation process may produce multiple potential matches 830 depending on the specificity of the product description entered. For example, if a user enters the phrase "washing machine" in the product description, many more results may be returned than if the user entered the UPC code of a specific washing machine model. In another example, if the user enters "Whirlpool Duet WFW9150WW," then the system may present options limited only to that specific model as it is identified in the database.

In one embodiment, the user may be provided with an option to narrow the search results 820 by including limitations such as, for example, the brand name of the purchased product or the price range within which the purchase price is located. In certain embodiments, images or videos of each potentially matching product 830 may be displayed to the user to facilitate the choice of the actual product purchased. If any of the displayed products 830 correspond to the actual purchased product, the user may select that product to be linked to her account.

Figure 9:
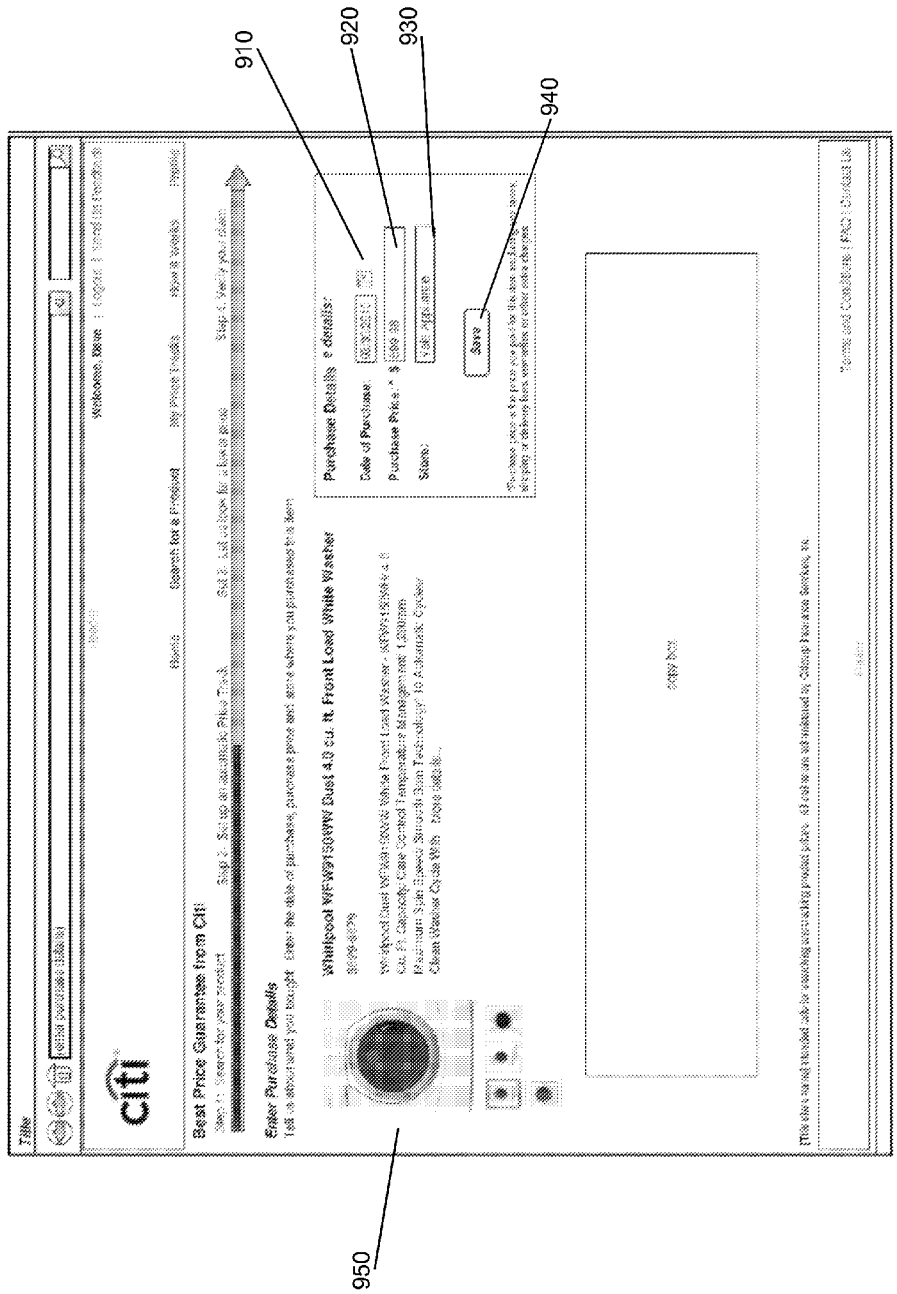
FIG. 9 shows a screen shot of a user interface according to an exemplary embodiment.

Referring to FIG. 9, once the purchased product 950 is selected, the user may be prompted to enter the details of the purchase, or transaction information, including but not limited to, the date of purchase 910, the purchase price 920, and the name of the retailer from which the product was purchased 930. In the exemplary embodiment shown in FIG. 9, the user has purchased a "Whirlpool WFW9150WW Duet 4.0 cu. ft. Front Load White Washer" on Mar. 30, 2010. The product was purchased for $699.98 at "Yale Appliance." Having entered the requested information, the user may save the information to the server by clicking the "save" button, icon, or link 940. Once this information is stored onto a database, it may be accessed by a server to determine refund eligibility and/or to complete electronic documents such as claim forms and correspondences.

Figure 10:
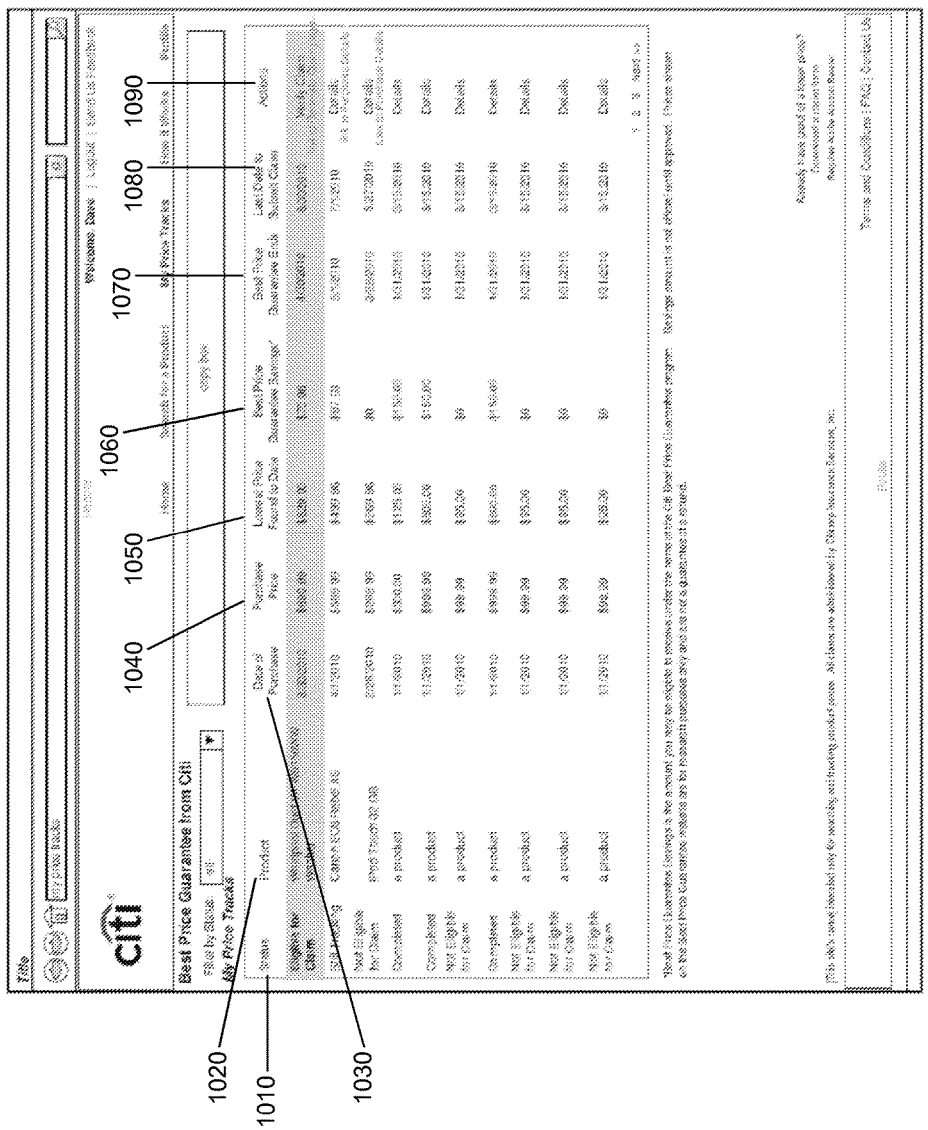
FIG. 10 shows a screen shot of a user interface according to an exemplary embodiment.

At FIG. 10, a screenshot of an exemplary embodiment is shown wherein a list of user-entered purchased products is displayed. In certain embodiments, the user may enter any number of purchased products to be tracked, and each product may be displayed in a list view. In one embodiment, the list view includes, for example, status information 1010, the purchased product name 1020, the date of purchase 1030, the purchase price 1040, the lowest price found to date 1050, the difference between the purchase price and the lowest price to date ("best price guarantee savings") 1060, the best price guarantee end date 1070, the last date to submit a claim 1080, and any available actions 1090 are displayed to the user. In one embodiment, the purchased product name 1020, the date of purchase 1030 and the purchase price 1040 may be entered by the user. In another embodiment, the best price guarantee end date 1070 may relate to a predetermined time period calculated from the purchase date 1030. Once the best price guarantee end date 1070 arrives, the system may terminate the search for lower prices on the purchased item and the lowest price will be static.

In yet another embodiment, the last date to submit a claim 1080 may be the same date as the best price guarantee end date 1070 or any time after, as determined by an agreement between the financial institution and a third party, such as an insurance provider or a second financial institution. For example, an insurance provider may enter into an agreement with the financial institution to provide a refund equal to any amount of the difference between the purchase price 1040 and the lowest price identified 1050. Once an agreement is established, the insurance provider may agree to accept claims for a certain period of time after the best price guarantee end date 1070, for example, up to one week, two weeks, one month, two months, or any other chosen time period.

Figure 11:
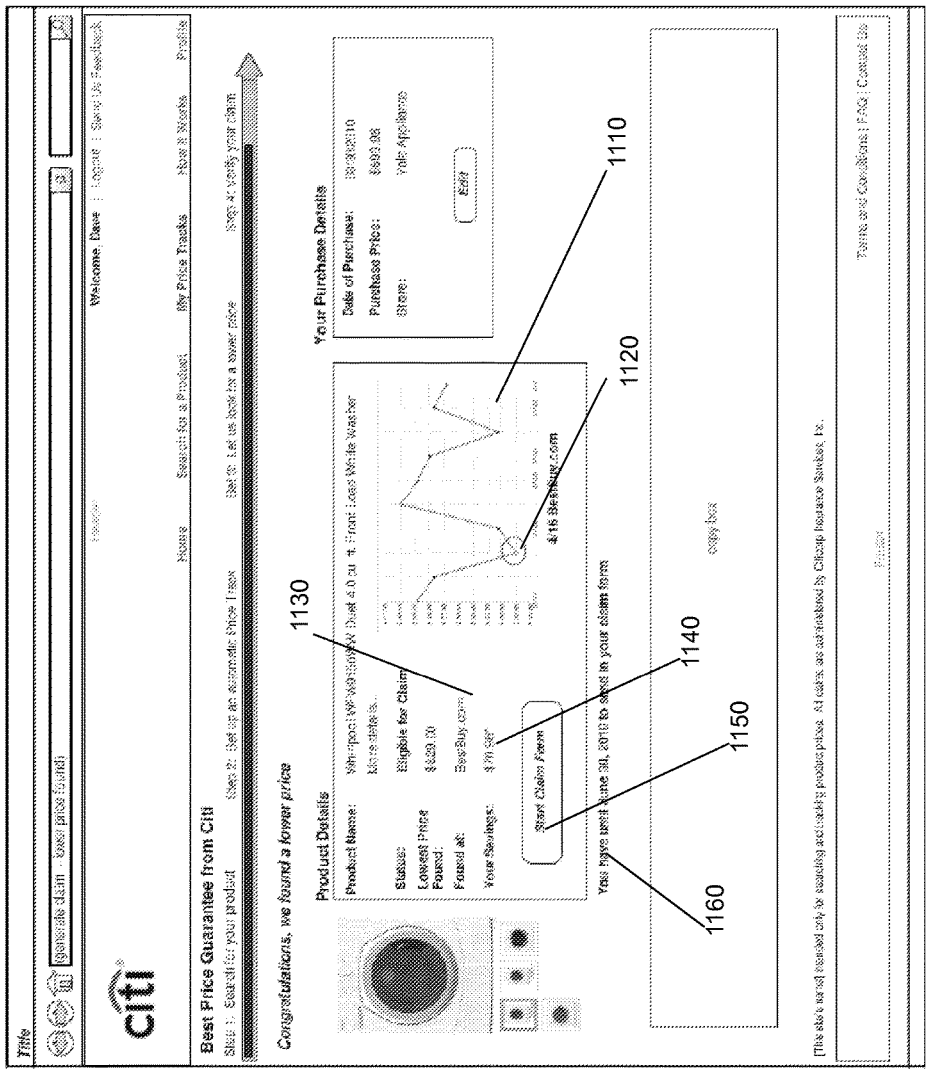
FIG. 11 shows a screen shot of a user interface according to an exemplary embodiment.

Referring to FIG. 11, a screenshot of an exemplary embodiment is shown wherein the details of a search for a price that is lower than the purchase price may be displayed to a user. As shown, a graphical representation 1110 of the price of the purchase product over a time period may be displayed. The graphical representation may be annotated 1120 to show, for example, the lowest price at which the purchased product was offered or advertised and the date of the lowest price offering or advertisement.

In one embodiment, the lowest price may be dependent upon a particular geographic area or areas. For example, the lowest price may only include qualifying prices obtained from advertisements that are obtained from, or published within, a certain city, town, village, county, state, or country. Alternatively, the lowest price may be determined without regard to geographic area.

In another embodiment, the lowest price may be determined by entering acquired advertised prices into the system. Each advertised price may be compared to the lowest price. When an advertised price is less than the lowest price, the lowest price may be reset to the advertised price and stored on the server. If the new lowest price is less than the purchase price, the user may be notified, and the option to complete a claim form may be made available to the user. In yet another embodiment, advertised prices may be manually compared to the lowest price, and the lowest price may be manually adjusted upon the finding of a lower advertised price. In certain embodiments where the lowest price may be dependent upon geographic area or areas, the advertised price may only be compared to the lowest price if the advertised price is obtained from, or published in, at least one qualifying geographic area.

In yet another embodiment, the lowest price may be dependent upon a particular set of qualifications for retailers. For example, the lowest price may only include prices obtained from advertisements that are obtained from or published by a certain type of retailer. The qualifications of each retailer may be based on any number of variables, such as the size of the retailer or the reputation of the retailer.

Referring still to FIG. 11, the retailer 1130 at which the lowest price was identified may also be displayed to the user along with the savings 1140 realized by the user. The savings 1140 realized may be equal to the difference between the purchase price and the lowest price.

In certain embodiments, a "start claim form" button, link, or icon 1150 may be displayed to the user. By clicking or otherwise selecting the "start claim form" button 1150, the user may be directed to a webpage to verify any previously entered information. Alternatively, the selection of the "start claim form" button 1150 may automatically generate a completed claim form without any additional input by the user. In certain embodiments, the deadline by which the claim form must be sent 1160 may also be displayed to the user.

Figure 12:
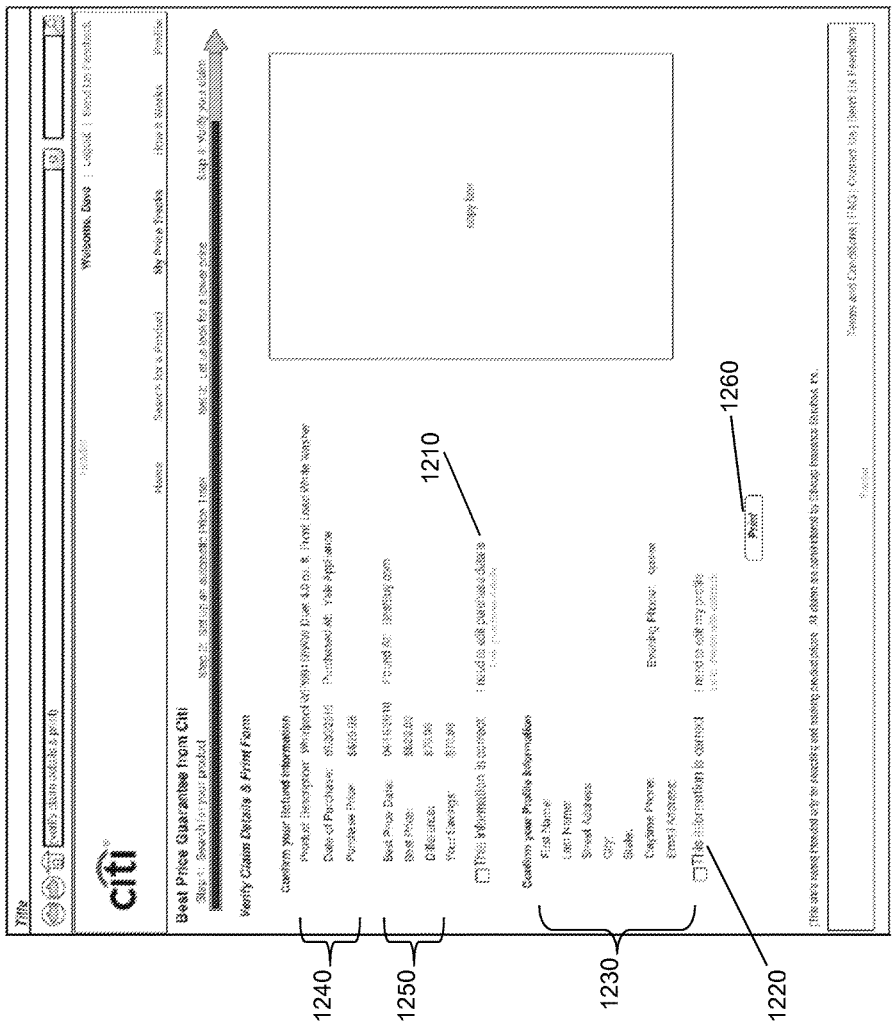
FIG. 12 shows a screen shot of a user interface according to an exemplary embodiment.

Referring to the screenshot of an exemplary embodiment shown in FIG. 12, the user has selected a "start claim form" button, and has been transferred to an exemplary webpage for verification of information. The user's personal information 1230, previously entered transactional information 1240, the results of the best price guarantee search 1250, and any combination thereof may be displayed to a user for review and verification. If the information displayed is accurate, the user may select, for example, the "this information is correct" button, link, or icon 1220. If, however, any of the information displayed is incorrect, the user may select the appropriate link to edit the errant data 1210. Once the information is correct, and the user has verified the information by selecting the "this information is correct" button 1220, the user may select, for example, the "print" button, icon, or link 1260 to have a claim form automatically generated and completed by the system.

In one embodiment, the user is presented with an additional option to select the company or entity to which the claim form will be ultimately submitted (not shown). Depending on the company or entity selected, the system may generate a claim form with a layout or format that is specifically tailored to be accepted by the selected company or entity. The system may store the different claim forms, allow users to upload claim forms, or contain the ability to automatically search for and download the claim form templates. In another embodiment, the claim form may be transmitted from the selected entity through a network.

As an example, if the user will be submitting the form to a particular insurance company, the user may select that company from a provided list. The particular claim form used by the selected company could then be accessed on the system, and displayed to a user upon the selection of the "print" button 1220.

Once the claim form is generated, it may be automatically completed using the personal information 1230, previously entered transactional information 1240, the results of the best price guarantee search 1250, and any/or combination thereof. The generated and completed claim form may then be transmitted to the user by, for example, email, mail, fax, or download.

Figure 13:
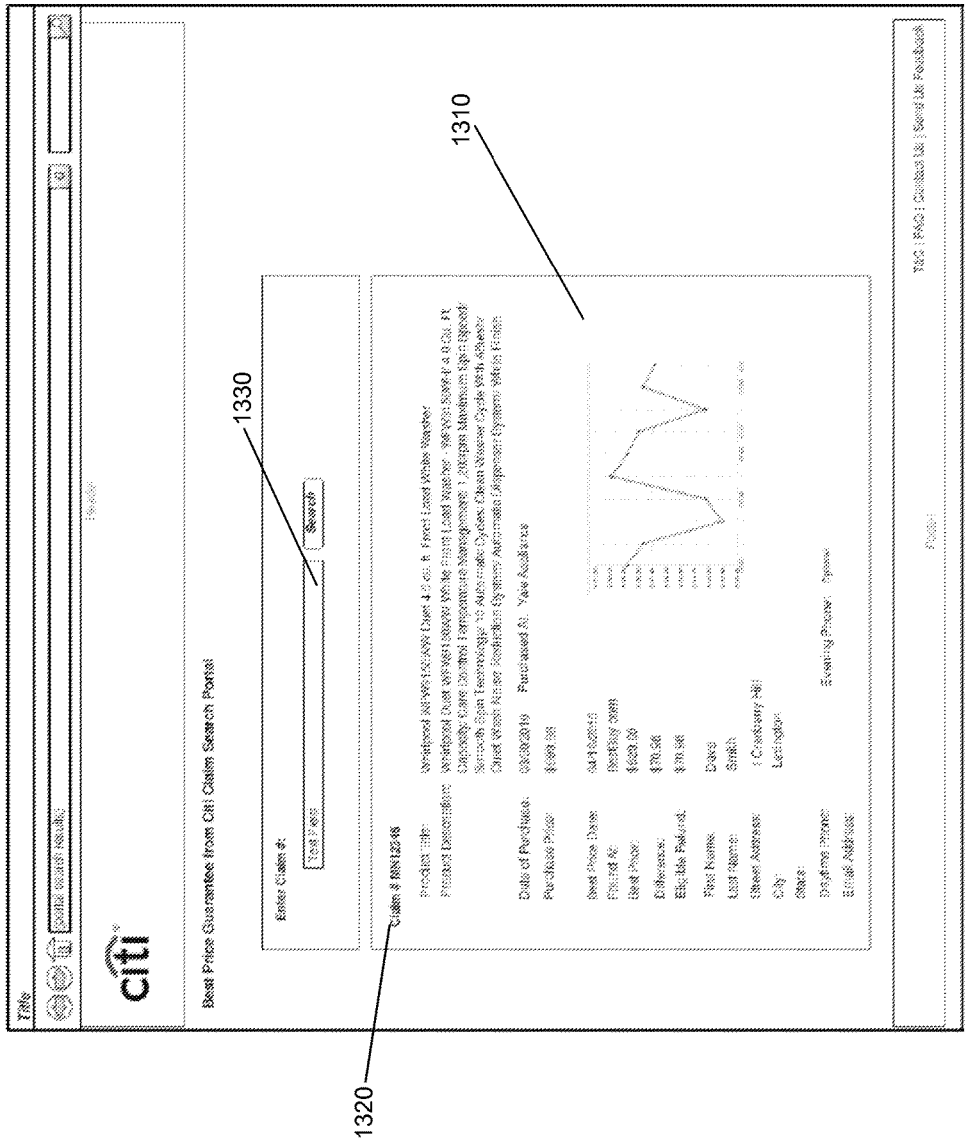
FIG. 13 shows a screen shot of a user interface according to an exemplary embodiment.

Referring to FIG. 13, a screenshot of an exemplary embodiment is shown wherein a completed claim form 1310 is displayed to the user. As can be seen, the completed claim form may be assigned a claim number 1320. The claim number 1320 may comprise any alpha-numeric combination. The completed claim form 1310 and corresponding claim number 1320 may be stored on the server in, for example, a claim form database. Once stored, the completed claim form 1310 may be accessed by entering the corresponding claim number 1320 into a search field 1330. Additionally, by accessing the completed claim form 1310, the user may, for example, print the claim form or download the claim form to her computer.

The user can verify and sign the claim form. The signed claim form can be submitted to the financial institution or another entity, such as an insurance company, who will process the claim for providing payment to the user. In an alternative embodiment, the claim form can be automatically generated and submitted for payment when a lower price is identified. The automatic submission can occur upon finding the lower price, at the expiration of a predetermined period, or any other time.

In an alternative embodiment, the server can process a payment of a refund without generating a claim form. Upon identifying that there is a lower price for the purchased product or service within a predetermined time period, the server will generate a file that contains a difference between the purchase price and the lowest price, a customer's account information, and other purchase information (e.g., product or service purchased, date of purchase, merchant or retailer). The server transmits the file to a server of an underwriter or insurer to initiate the payment process. The underwriter server can validate the information (e.g., confirm that a credit card of the financial institution was used in the purchase, confirm that the customer has not already received a refund, or confirm that the lowest price is associated with the purchased product or service) before generating a payment request. The underwriter then generates a payment request and transmits it to a payment processor server for processing.

Unless specifically stated otherwise as apparent from the following discussion, it is appreciated that throughout the description, discussions utilizing terms such as "matching" or "computing" or "calculating" or "determining" or "displaying" or "comparing" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

The exemplary embodiments can relate to an apparatus for performing one or more of the functions described herein. This apparatus may be specially constructed for the required purposes, or it may comprise a computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method comprising:
   receiving, by a server of a financial institution, purchase information regarding a customer who completed a transaction with any merchant, wherein the purchase information comprises a purchase price and purchased product or service description of the purchased product or service and an identifier of the financial institution's customer's credit or debit card issued by the financial institution;
   storing, by the server, the purchase information in a first database;
   locating, by the server, from a second database, stored product or service information corresponding to the received purchased product description from a completed purchase transaction,
      wherein the stored product information comprises a lowest price datum;
   tracking, by the server of the financial institution, the lowest price datum within a predetermined time period from the purchase of the product or service;
   comparing, by the server, the lowest price datum to the purchase price; and
   when a difference between the lowest price datum and the purchase price of the completed purchase transaction is within the predetermined time period from the purchase of the product or service, generating and transmitting a data file based on the difference between the lowest price datum and the purchase price that initiates a payment to the customer.

2. The computer-implemented method of claim 1, wherein said purchase information further comprises information selected from the group consisting of a date of purchase, a retailer name, a retailer location, a retailer phone number, a product serial number, a product UPC code, and a product model number.

3. The computer-implemented method of claim 1 further comprising updating, by the server, the lowest price datum.

4. The computer-implemented method of claim 3, wherein the updating occurs at predetermined intervals.

5. The computer-implemented method of claim 3, wherein the updating comprises:
   comparing the lowest price datum to a second price datum obtained from an external source;
   if the second price datum is less than the lowest price datum, setting the lowest price datum equal to the second price datum.

6. The computer-implemented method of claim 5, wherein the external source is an advertisement.

7. The computer-implemented method of claim 1, wherein receiving the purchased product or service description comprises:
   receiving, by the server, a data file generated by a merchant server that comprises an identification of a product or service, the an identifier of the financial customer's credit or debit card issued by the financial institution and used in the purchase, and a date of the purchase; and
   associating, by the server, the received information in the data file with a record in the first database associated with the customer.

8. The computer-implemented method of claim 1, wherein receiving the purchased product or service description comprises:
   receiving, by the server from an electronic device of the customer, a data file comprising an image of a receipt for the purchase; and associating, by the server, receipt information from the receipt with a record in the first database associated with the customer.

9. The computer-implemented method of claim 8, further comprising extracting, by the server, the receipt information from the image of the receipt.

10. A system comprising:
a server of a financial institution adapted to receive purchase information regarding a customer who completed the transaction with any merchant, wherein the purchase information comprises a purchase price and purchased product or service description of the purchased product or service and an identifier of the financial institution's customer's credit or debit card issued by the financial institution;
a first database communicatively coupled to the server and adapted to store the purchase information from a completed product purchase transaction; and
a second database communicatively coupled to the server and adapted to store product or service information,
wherein the product information comprises a lowest price datum;
wherein the server tracks the product or service information from the second database corresponding to the purchase information located at the first database within a predetermined time period from the purchase of the product or service, and
wherein the server compares the lowest price datum to the purchase price, and
wherein the server generates and transmits a data file based on the difference between the lowest price datum and the purchase price for the customer when the lowest price is less than the purchase price within the predetermined time period from the purchase of the product or service, wherein the data file initiates a payment to the customer.

11. The system of claim 10, further comprising a third database communicatively coupled to the server and adapted to store personal information.

12. The system of claim 10, wherein the server is further configured to receive a data file generated by a merchant server that comprises an identification of a product or service, the an identifier of the financial customer's credit or debit card issued by the financial institution and used in the purchase, and a date of the purchase, and associate the received information in the data file with a record in the first database associated with the customer.

13. The system of claim 10, wherein the server is further configured to receive a data file from an electronic device of the customer comprising an image of a receipt for the purchase, and associate receipt information from the receipt with a record in the first database associated with the customer.

14. The system of claim 13, wherein the server is further configured to extract the receipt information from the image of the receipt.

15. A computer program product, comprising a computer usable medium having computer readable program code embodied therein, the computer readable program code adapted to be executed by a processor to implement a method comprising:
receiving, by a customer identification module of the program code executed by the processor of a financial institution, information input that identifies a customer;
receiving, by a product identification module of the program code executed by the processor of the financial institution, a description of a product or service purchased by the customer,
wherein the information input that identifies the customer and the description of the product or service purchased by the customer involve a transaction with any merchant to purchase the product or service using a credit or debit card was issued by a financial institution;
identifying, by the price identification module of the program code executed by the processor, available prices for the product or service within a predetermined time period;
identifying, by the price identification module of the program code executed by the processor, a lower price for the purchased product or service from the available prices within the predetermine time period; and
generating and transmitting, by a claim submission module of the program code executed by the processor, a data file initiating a payment to the customer with a refund based upon the lower price identified within the predetermined time period.

16. The computer program product of claim 15, wherein receiving the description of the purchased product or service comprises:
receiving, by the product identification module of the program code executed by the processor, a data file generated by a merchant server that comprises an identification of a product or service, the an identifier of the financial customer's credit or debit card issued by the financial institution and used in the purchase, and a date of the purchase; and
associating, by the product identification module of the program code executed by the processor, the received information in the data file with a record in the first database associated with the customer.

17. The computer program product of claim 15, wherein receiving the description of the purchased product or service comprises:
receiving, by the product identification module of the program code executed by the processor from an electronic device of the customer, a data file comprising an image of a receipt for the purchase; and
associating, by the server, receipt information from the receipt with a record in the first database associated with the customer.

18. The computer program product of claim 17, further comprising extracting, by the product identification module of the program code executed by the processor from an electronic device of the customer, the receipt information from the image of the receipt.

19. The computer program product of claim 15, further comprising comparing, by the product identification module of the program code executed by the processor, the description of the product or service to a listing of descriptions of products or services to identify the product or service.

20. A computer program product, comprising a computer usable medium having computer readable program code embodied therein, the computer readable program code adapted to be executed by a processor to implement a method comprising:
receiving, by a customer identification module of the program code executed by the processor of a financial institution, information input that identifies a customer;
receiving, by a product identification module of the program code executed by the processor of the financial institution, a product description of a product or service from a cellular phone of the customer, wherein the information input that identifies the customer and the description of the product or service purchased by the customer involve a transaction with any merchant to purchase the product or service using a credit or debit card was issued by a financial institution;

identifying, by the product identification module of the program code executed by the processor, the product based on the product or service description;

identifying, by the price identification module of the program code executed by the processor, available prices for the identified product or service within a predetermined time period;

identifying, by the price identification module of the program code executed by the processor, a lower price for the purchased product or service; and generating, by a claim submission module of the program code executed by the processor, a data file initiating a payment to the customer with a refund based upon the lower price identified during the predetermined time period.

21. The computer program product according to claim 20, wherein receiving the product description of the product or service from the cellular phone of the customer comprises obtaining the product or service description based upon a data file transmitted from the cellular phone that scanned or captured a bar code of the product or service.

22. The computer program product according to claim 20, wherein receiving the description of the purchased product or service comprises:

receiving, by the product identification module of the program code executed by the processor from the cellular phone of the customer, a data file comprising an image of a receipt for the purchase; and associating, by the server, receipt information from the receipt with a record in the first database associated with the customer.

23. The computer program product according to claim 22, further comprising extracting, by the product identification module of the program code executed by the processor from the cellular phone of the customer, the receipt information from the image of the receipt.

24. The computer program product according to claim 22, wherein the data file comprising the image of the receipt further comprises data representing receipt information.

* * * * *